(12) United States Patent
Zhang et al.

(10) Patent No.: US 9,343,893 B2
(45) Date of Patent: May 17, 2016

(54) DEVICE AND METHOD FOR FIELD EXPANSION

(75) Inventors: Ming Zhang, Shanghai (CN); Jinquan Yang, Shanghai (CN); Zheng Huang, Shanghai (CN); Zhigang Xu, Shanghai (CN); Jiangjiang Ma, Shanghai (CN); Lei Guo, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 266 days.

(21) Appl. No.: 14/116,298
(22) PCT Filed: Jul. 27, 2011
(86) PCT No.: PCT/CN2011/077689
§ 371 (c)(1),
(2), (4) Date: Nov. 7, 2013
(87) PCT Pub. No.: WO2012/159348
PCT Pub. Date: Nov. 29, 2012

(65) Prior Publication Data

US 2014/0096358 A1 Apr. 10, 2014

(30) Foreign Application Priority Data

May 20, 2011 (CN) .......................... 2011 1 0145742

(51) Int. Cl.
*B29C 55/00* (2006.01)
*H02G 15/18* (2006.01)
(Continued)

(52) U.S. Cl.
CPC ............ *H02G 15/1826* (2013.01); *B29C 55/24* (2013.01); *B29C 61/065* (2013.01);
(Continued)

(58) Field of Classification Search
CPC ... H02G 15/1826; H02G 15/182; H02G 1/14; H02G 15/08; B29C 55/24; B29C 61/065; B29C 63/19; B29C 65/44; Y10T 29/53391; Y10T 29/53657; Y10T 29/4987
See application file for complete search history.

(56) References Cited

U.S. PATENT DOCUMENTS 6,162,383 A 12/2000 Hane

FOREIGN PATENT DOCUMENTS

CN 1219904 6/1999
CN 2836284 11/2006
(Continued)

OTHER PUBLICATIONS

Okamoto, Takeshi; JP 11-205937 A; Jul. 1999; Machine Translation.*
(Continued)

*Primary Examiner* — David Bryant
*Assistant Examiner* — Lee A Holly
(74) *Attorney, Agent, or Firm* — Gregg H. Rosenblatt

(57) ABSTRACT

A device and a method for a field expansion. A support core (30) is inserted into the device by a field expansion apparatus. The field expansion apparatus has a pressure applying means (20) defining a radially expandable inner surface and a flat surface radially outwardly extending from the radially expandable inner surface. The device comprises an elastomeric tubing (10) and an adapter (40). The elastomeric tubing (10) has a forward end opposite a rearward end and an axial bore extending therethrough configured to receive the support core (30). The adapter (40) has a step portion (41) defined by a radial outer surface (42) and a flat surface (43) radially outwardly extending from the radial outer surface (42), and an axial bore (44) extending therethrough. The axial bore (44) has a diameter substantially the same as the diameter of the axial bore (12) of the elastomeric tubing (10). The adapter (40) is positioned substantially coaxially with the elastomeric tubing (10) between the pressure applying means (20) and the elastomeric tubing (10) such that, in response to inserting the support core (30) from the rearward end into the elastomeric tubing (10), the flat surface of the adapter (40) is pushed against the flat surface of the pressure applying means (20) by the elastomeric tubing (10); the interface between a rearward end of the adapter (40) and the forward end of the elastomeric tubing (10) is of high friction so that the adapter (40) and the elastomeric tubing (10) expand radially in unison, and the radial outer surface of the adapter (40) exerts a radially outward pressure against the radially expandable inner surface of the pressure applying means (20). device and method for field expansion device and method for field expansion.

15 Claims, 5 Drawing Sheets

(51) Int. Cl.
  *B29C 55/24* (2006.01)
  *B29C 61/06* (2006.01)
  *B29K 21/00* (2006.01)
  *B29C 63/18* (2006.01)

(52) U.S. Cl.
  CPC .............. *H02G15/182* (2013.01); *B29C 63/18* (2013.01); *B29K 2021/00* (2013.01); *Y10T 29/4987* (2015.01); *Y10T 29/53391* (2015.01); *Y10T 29/53657* (2015.01)

(56) References Cited

FOREIGN PATENT DOCUMENTS

| | | |
|---|---|---|
| CN | 101386208 | 4/2011 |
| DE | 19720758 | 11/1998 |
| EP | 0368236 | 5/1990 |
| EP | 0424090 | 4/1991 |
| JP | 11-502399 | 2/1999 |
| JP | 11-205937 | 7/1999 |
| JP | 11205937 A * | 7/1999 |
| JP | 2000-152480 | 5/2000 |
| JP | 2000-224750 | 8/2000 |
| JP | 2002-027628 | 1/2002 |
| RU | 1808723 | 4/1993 |
| SU | 1435478 | 11/1988 |
| WO | WO 2007/046115 | 4/2007 |

OTHER PUBLICATIONS

Japanese Notice of Allowance for Application No. 2014-510638, dated Sep. 29, 2015, 3pgs.
Russian Notice of Allowance for Russian Patent Application No. 2013156466, dated Oct. 23, 2015, 10pgs.
Supplementary European Search Report, EP No. EP 11866163, 2pgs, Oct. 2014.
International Search Report for PCT International Application No. PCT/CN2011/077689, mailed on Mar. 8, 2012, 5 pages.

* cited by examiner

DEVICE AND METHOD FOR FIELD EXPANSION

FIELD OF THE INVENTION

The disclosure relates generally to a device and method for field expansion, and particularly relates to a device and method for field expansion without decreasing structural integrity.

BACKGROUND OF THE INVENTION

Field expansion is a known method for stretching an elastomeric sleeve on site before application of the sleeve over a substrate by inserting a support core with an outside diameter larger than an inside diameter of the sleeve therethrough so that the sleeve expands in the radial direction. After the support core with the sleeve stretched thereon is positioned around the substrate, the support core is removed to allow the sleeve to shrink and tighten over the substrate so that electrical, air and/or water insulation is achieved over the substrate. The substrate can be spliced cables, terminated cables or any other form that need to be insulated or protected.

Conventional sleeves for field expansion on site typically comprise a step portion at one end thereof. The step portion provides axial positioning of the sleeve when a support core is inserted from the other end of the sleeve and allows for radial expansion of the stepped end in response to the insertion, as understood by those skilled in the art. However, the step portion decreases the structural integrity of the sleeve, and thus, in practice, stress concentration may occur at the step portion which can cause cracks in the material and lead to insulation failure. Other options for applying sleeves over substrates include pre-loaded cold shrink method and push-on method. The sleeves for pre-loaded cold shrink are pre-stretched and loaded on a core in advance of reaching the installation site. The sleeves for push-on don't need field expansion. Both the sleeves for pre-loaded cold shrink and the sleeves for push-on don't have the stepped portion, and therefore don't have the integrity problem. In some cases, the sleeves for pre-loaded cold shrink and the sleeves for push-on are desired to be expanded on site for purpose of convenient installation or some other purposes. However the configuration of some sleeves for pre-loaded cold shrink and some sleeves for push-on make it difficult or infeasible to expand such kind of sleeves on site by conventional field expansion methods.

SUMMARY OF THE INVENTION

It would therefore be desirable to achieve a device and method permitting field expansion on site without decreasing structural integrity of sleeves.

In one aspect, an embodiment of the disclosure provides a device, into which a support core is to be inserted by a field expansion apparatus, the field expansion apparatus having a pressure applying means defining a radially expandable inner surface and a flat surface radially outwardly extending from the radially expandable inner surface, the device comprising: an elastomeric tubing, having a forward end opposite a rearward end and an axial bore extending therethrough configured to receive the support core; and an adapter, having a step portion defined by a radial outer surface and a flat surface radially outwardly extending from the radially outer surface, and an axial bore extending therethrough, the axial bore having a diameter substantially the same as the diameter of the axial bore of the elastomeric tubing; the adapter being positioned substantially coaxially with the elastomeric tubing between the pressure applying means and the elastomeric tubing such that, in response to inserting the support core from the rearward end into the elastomeric tubing, the flat surface of the adapter is pushed against the flat surface of the pressure applying elements by the elastomeric tubing, the interface between a rearward end of the adapter and the forward end of the elastomeric tubing is of high friction so that the adapter and the elastomeric tubing expand radially in unison, and the radial outer surface of the adapter exerts a radially outward pressure against the radially expandable inner surface of the pressure applying means.

In another aspect, an embodiment of the disclosure provides a method, comprising: positioning an adapter coaxially with an elastomeric tubing, the elastomeric tubing having a forward end opposite a rearward end and an axial bore extending therethrough configured to receive the support core, the adapter having a step portion defined by a radially outer surface and a flat surface radially outwardly extending from the radially outer surface, and an axial bore extending therethrough, the axial bore having a diameter substantially the same as the diameter of the axial bore of the elastomeric tubing; engaging the radially outer surface of the adapter with a radially expandable inner surface defined by a pressure applying means of a field expansion apparatus; and inserting a support core having an outside diameter greater than the diameter of the axial bores from the rearward end into the elastomeric tubing.

The above summary of the present invention is not intended to describe each disclosed embodiment or every implementation of the present invention. The Figures and detailed description that follow below more particularly exemplify illustrative embodiments.

BRIEF DESCRIPTION OF THE DRAWINGS

Embodiments of the disclosure are better understood with reference to the following drawings. The elements of the drawings are not necessarily to scale relative to each other.

DETAILED DESCRIPTION

In the following detailed description of the preferred embodiments, reference is made to the accompanying drawings that form a part hereof. The accompanying drawings show, by way of illustration, specific embodiments in which the disclosure may be practiced. The illustrated embodiments are not intended to be exhaustive of all embodiments according to the disclosure. It is to be understood that other embodiments may be utilized and structural or logical changes may be made without departing from the scope of the disclosure. The following detailed description, therefore, is not to be taken in a limiting sense, and the scope of the invention is defined by the appended claims.

In the following Detailed Description, reference is made to the accompanying drawings, which form a part hereof, and in which is shown by way of illustration specific embodiments in which the invention may be practiced. In this regard, directional terminology, such as "left", "right", "top", "bottom", "front", "back", "leading", "forward", "trailing", etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Hereinafter, for purpose of clarity, aspects of the disclosure are described and illustrated herein by way of example in the field of cable connection. However, such illustration is exemplary only, and it is understood and intended that the device and method can be employed with all applications concerned with sealing or protection using field expansion method.

Figure 1:
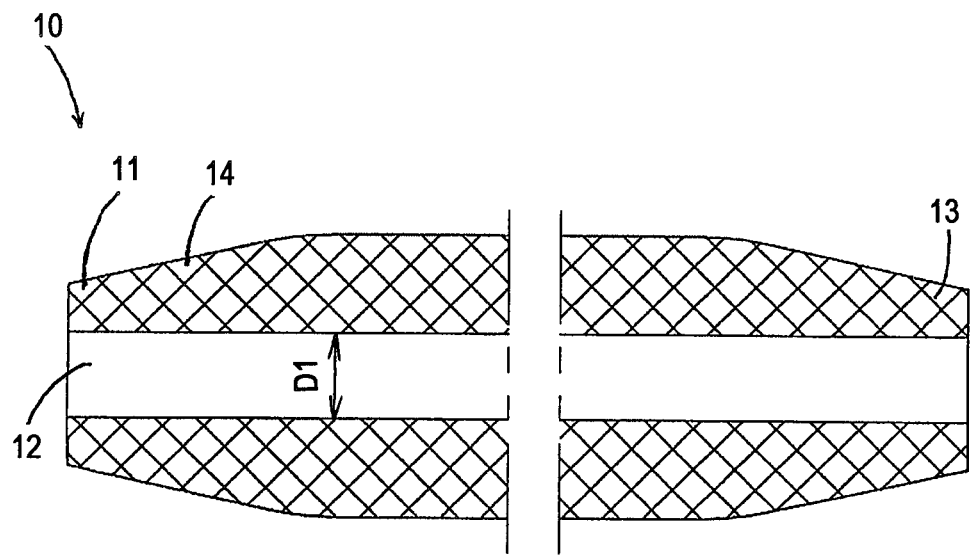
FIG. 1 illustrates a cross sectional view of an elastomeric tubing into which a support core is to be inserted.

FIG. 1 illustrates a cross sectional view of an elastomeric tubing 10 into which a support core (indicated by reference numeral 30 in FIG. 2) is to be inserted on site. As shown in FIG. 1, the elastomeric tubing 10 comprises a forward end 11 opposite a rearward end 13 and an axial bore 12 extending through the elastomeric tubing 10 which is configured to receive the support core 30. The elastomeric tubing 10 further comprises a tapered portion 14 adjacent the forward end 11 (and rearward end 13). The elastomeric tubing 10 may be conventional sleeves, for example, sleeves for pre-loaded cold shrink and sleeves for push-on.

As can be understood by those skilled in the art, the diameter D1 of the axial bore 12 of the unstretched or relaxed elastomeric tubing 10 is designed to be smaller than an outside diameter D2 of the support core 30 to be inserted, so that the elastomeric tubing 10 expands when the support core 30 is inserted within the axial bore 12 and shrinks to tighten over a substrate (for example, joint cables) upon removal of the support core 30.

Figure 2:
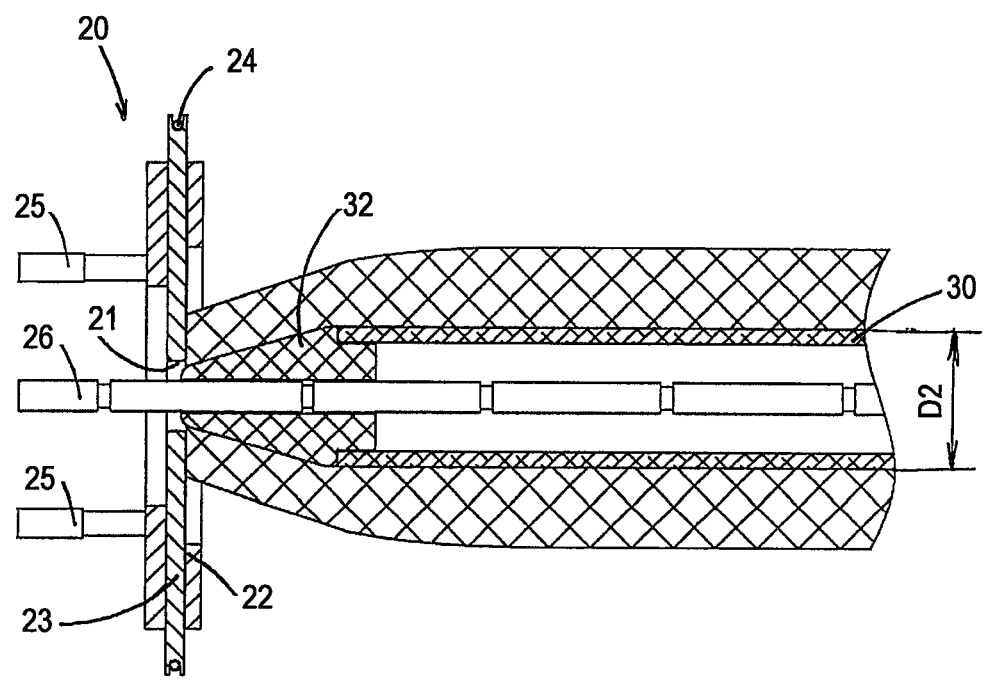
FIG. 2 illustrates a cross sectional partial view of a process to insert a support core into the elastomeric tubing in FIG. 1 using a conventional method.

FIG. 2 illustrates a cross sectional partial view of a process to insert the support core 30 into the elastomeric tubing 10 in FIG. 1 using a conventional method. In the method, the support core 30 is inserted into the elastomeric tubing 10 by a field expansion apparatus which essentially comprises a shaft 26 coupled with an actuator (not shown), a pressure applying means 20, and a plurality of rods 25 mechanically coupling the pressure applying means 20 to a bracket (not shown) which is operatively fastened to ground or other surfaces. During operation, the actuator acts on the support core 30 via the shaft 26 to pull it into the elastomeric tubing 10 from the rearward end 13, and the pressure applying means 20 engages the elastomeric tubing 10 in proximity of the forward end 11 for fixing its position in the axial direction and is expected to react to the axial force which causes the translation of the support core 30. To facilitate insertion, the support core 30 is illustrated to further comprise a homing head 32 with a tapered configuration, as understood by the skilled in the art.

Figure 3:
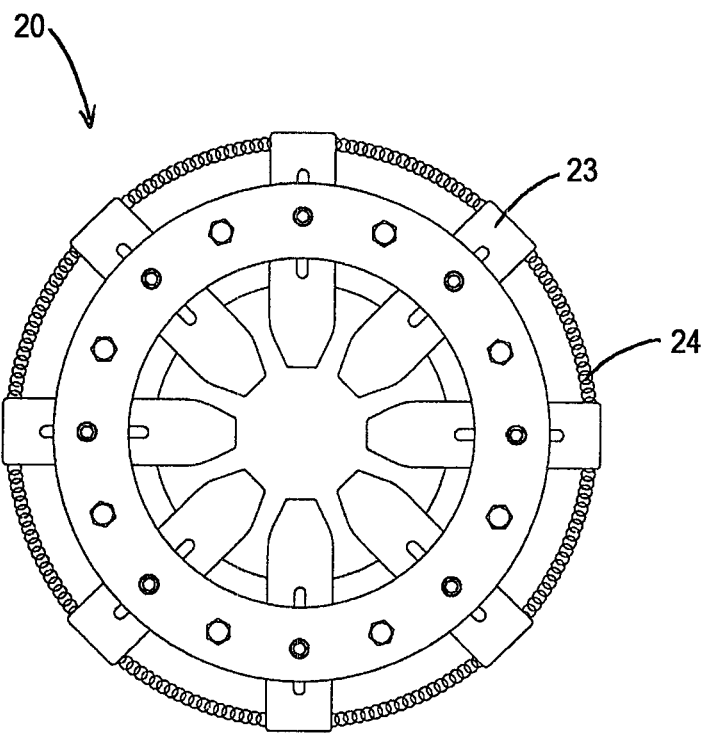
FIG. 3 illustrates a portion of the field expansion apparatus used in the process in FIG. 2.

Specifically, referring to FIG. 3, the pressure applying means 20 comprises a plurality of plate-shaped pressure elements 23 arranged radially to collectively define a substantially continuous cylindrical inner surface 21 (see FIG. 2), and a spring ring 24 connected with a radially outer end of each of the plurality of pressure elements 23. Each of the plurality of pressure elements 23 is radially movably fixed and the cylindrical inner surface 21 is radially expandable in response to a radially outward pressure on the plurality of pressure elements 23.

However the tapered forward end 11 of the elastomeric tubing 10 does not distribute a radially outward pressure on the plurality of the pressure elements 23 due to the interfacial configuration between the tapered forward end 11 of the elastomeric tubing 10 and the plurality of the pressure elements 23. As a result, the forward end 11 of the elastomeric tubing 10 is prone to deformation when the support core 30 is inserted into the axial bore 12 which may damage the elastomeric tubing 10. Furthermore, because the cylindrical inner surface 21 defined by the plurality of pressure elements 23 doesn't expand in response to the insertion of the support core 30, the homing head 32 of the support core 30 cannot move out from the forward end 11 of the elastomeric tubing 10 and the field expansion process cannot be accomplished.

Figure 4:
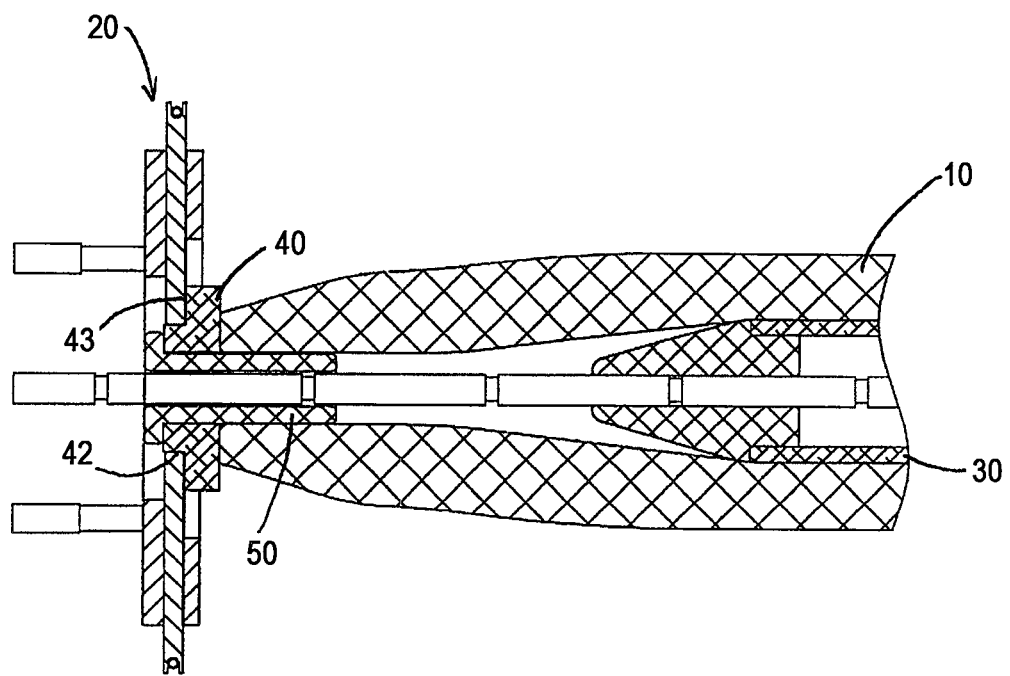
FIG. 4 illustrates a cross sectional partial view of a process to insert a support core into the elastomeric tubing in FIG. 1 using an embodiment of a method according to the disclosure.

FIG. 4 illustrates a cross sectional partial view of a process to insert the support core 30 into the elastomeric tubing 10 in FIG. 1 using an embodiment of a method according to the disclosure.

Figure 5:
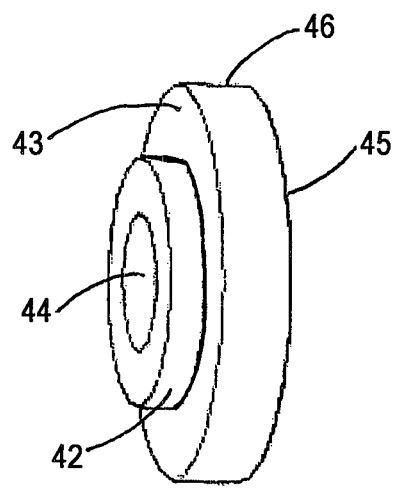
FIG. 5 illustrates a perspective view of an embodiment of an adapter according to the disclosure.
Figure 6:
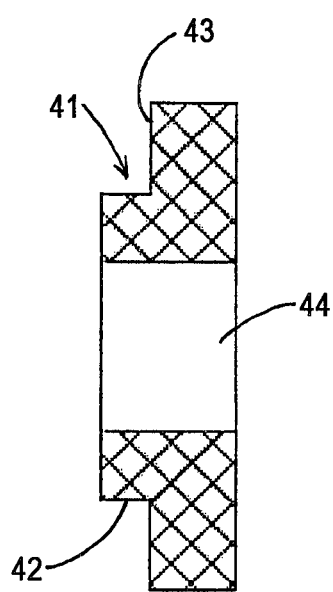
FIG. 6 illustrates a cross sectional view of the adapter in FIG. 5.

First, the elastomeric tubing 10 is positioned substantially coaxially with an adapter 40. It can be held in place, e.g., by connector 50, described in more detail hereafter. An embodiment of the adapter 40 for carrying out the method is depicted in FIGS. 5 and 6. As is shown, the adapter 40 comprises a step portion 41 which is defined by a radial outer surface 42 and a flat surface 43 radially outwardly extending from the radial outer surface 42. The adapter 40 further comprises an axial bore 44 having a relaxed diameter substantially same with the relaxed diameter of the axial bore 12 so that the homing head 32 and the support core 30 can be pushed out therethrough. The "substantially same" means that the axial bore 44 having a diameter slightly smaller or larger than the diameter of the axial bore 12 is also applicable.

Afterwards the radially outer surface 42 of the adapter 40 is engaged with the cylindrical inner surface 21 of pressure applying means 20 defined by the plurality of pressure elements 23. Such operation can be realized by, for example, applying a radially outward force on each of the plurality of pressure elements 23 so that the cylindrical inner surface 21 defined by the plurality of pressure elements 23 expands; afterwards placing the radially outer surface 42 of the adapter 40 inside the cylindrical inner surface 21; and then removing the radially outward forces, as a result, the plurality of pressure elements 23 are urged to move radially inwardly by the spring ring 24, due to a tendency of the spring ring 24 to contract when stretched, and thus come into engagement with the radially outer surface 42 of the adapter 40.

And then the support core 30 is inserted into the axial bore 12 of the elastomeric tubing 10 from the rearward end 13 to the forward end 11. Since the support core 30 has an outside diameter D2 greater than the diameter D1 of the axial bore 12, the elastomeric tubing 10 will be obliged to expand radially under the effect of radially outward pressure applied to it by the support core 30 during the insertion of the support core 30. More specifically, the radially outward pressure is applied in the zone where the support core 30 and the homing head 32 reach. While the support core 30 slides within the axial bore 12, there is produced a friction between the outer surface of the support core 30 and the surface of the axial bore 12. More specifically, there are a frictional force in the rearward axial direction on the support core 30 and an opposing frictional force in the forward axial direction on the elastomeric tubing 10. And thus the forward end 11 of the elastomeric tubing 10 abuts against the rearward end 45 of the adapter 40 and hence the flat surface 43 of the adapter 40 abuts against the flat surface 22 defined by the plurality of pressure elements 23. In such manner, the elastomeric tubing 10 and the adapter 40 are fixed in the axial direction.

The interface between the rearward end 45 of the adapter 40 and the forward end 11 of the elastomeric tubing 10 is configured such that the interface is of friction high enough to enable a unisonal expanding of the adapter 40 and the elastomeric tubing 10 before the homing head 32 reaches the adapter 40. In other words, the static frictional force in the radial direction between the adapter 40 and the elastomeric tubing 10 at their interface is greater than the radially inward force on the radial outer surface 42 of the adapter 40 applied by the pressure applying means 20, therefore no relative movement is generated between the rearward end 45 of the adapter 40 and the forward end 11 of the elastomeric tubing 10. Once the homing head 32 clears the elastomeric tubing 10 and reaches the adapter 40, the homing head 32 exerts a radially outward force on the adapter 40 at the contact interface between the homing head 32 and the adapter 40. As a result, the radial outer surface 42 of the adapter 40 exerts a radially outward force on the plurality of pressure elements 23. In this manner, the plurality of pressure elements 23 are urged to move radially outwardly and the cylindrical inner surface 21 expands which allows the homing head 32 to be pushed out of the elastomeric tubing 10.

It should be appreciated that the high friction at the interface between the rearward end 45 of the adapter 40 and the forward end 11 of the elastomeric tubing 10 can be realized by selecting suitable materials of the adapter 40 and the elastomeric tubing 10 which have high friction coefficient when in contact with each other. For example, the adapter 40 and the elastomeric tubing 10 can be made of liquid silicone rubber, ethylene propylene rubber (EPR), ethylene propylene diene monomer rubber (EPDM) or any other suitable materials. Preferably, the adapter 40 further comprises a second radially outer surface 46 extending rearwardly from the flat surface 43 and terminating at a rearward end 45 of the adapter 40 wherein the second radially outer surface 46 has a diameter larger than that of the forward end 11 of the elastomeric tubing 10 to ensure a sufficiently large contact area, and hence a sufficient frictional force, between the rearward end 45 of the adapter 40 and the forward end 11 of the elastomeric tubing 10.

It is to be noted that the field expansion apparatus may take on various forms. For example, each of the plurality of pressure elements 23 may be radially movably fixed by a respective spring. Alternatively, the spring 24 can be replaced with pneumatic or hydrodynamic drive systems or the like. And the devices and methods according to the disclosure can be used with any suitable field expansion apparatus.

Preferably, prior to inserting the support core 30 into the axial bore 12, a lubricant layer is applied to the surface of the axial bore 12 and the outer surface of the support core 30 so that the support core 30 can be inserted more smoothly. Furthermore, such a lubricant layer acts as a sealing layer between the surface of the bore 12 and the surface of cables to be insulated. In one example, the lubricant layer may comprise grease, gel, oil or any other suitable substances. It would be advantageous that the lubricant layer has a high viscosity, for example higher than $3 \times 10^5$ mPa·s, so that the lubricant layer is not prone to flow during operation and may remain uniformly distributed along the surface of the axial bore 12. In this way, risk of insulation failure due to nonuniform distribution of the lubricant layer can be lowered or eliminated.

The rearward end 45 of the adapter 40 is illustrated in FIG. 5, by way of example, in the form of an annular body. However, the adapter 40 is not limited to such configuration. The rearward end 45 of the adapter 40 can have any suitable shaped outer surfaces, for example, rectangular, hexagon, octagon and so on, as long as such configuration can provide a sufficiently large contact area with the forward end 11 of the elastomeric tubing 10 to generate static friction great enough to overcome the radially inward force of the pressure applying means 20.

Figure 7:
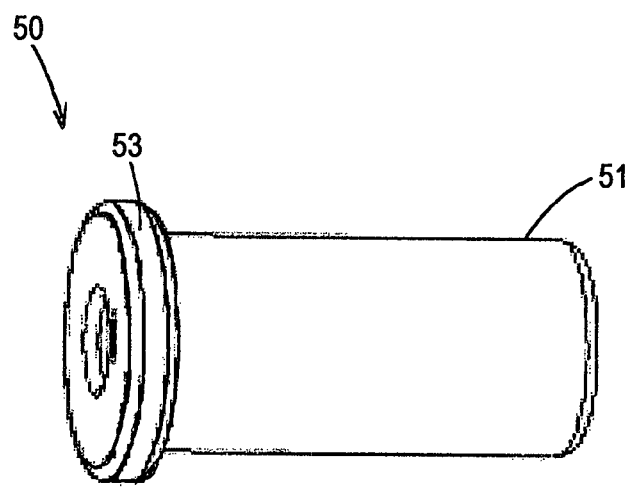
FIG. 7 illustrates a perspective view of an embodiment of a connector according to the disclosure.
Figure 8:
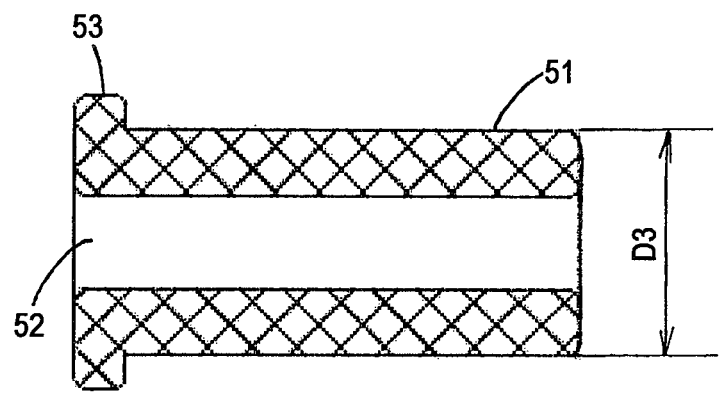
FIG. 8 illustrates a cross sectional view of the connector in FIG. 7.

FIGS. 7 and 8 illustrate an embodiment of a connector 50 that can be employed for carrying out the above described method for the purpose of positioning the adapter 40 coaxially with the elastomeric tubing 10. The exemplary connector 50 comprises a cylindrical outer surface 51 and an axial bore 52 permitting the shaft 26 of the field expansion apparatus through. The connector 50 has an outside diameter D3 substantially same as the diameter of the axial bore 12 of the elastomeric tubing 10 and the diameter of the axial bore 44 of the adapter 40 so that the connector 50 provides a substantially coaxial alignment between the adapter 40 and the elastomeric tubing 10, when it is positioned within the adapter 40 and the elastomeric tubing 10. The "substantially same" means that the connector 50 having an outside diameter slightly smaller or larger than the diameter of the axial bore 12 of the elastomeric tubing 10 and the diameter of the axial bore 44 of the adapter 40 is also applicable.

In operation, when the homing head 32 of support core 30 engages the rearward end of the connector 50 during insertion, the connector 50 is pushed in the forward axial direction and finally out of the adapter 40 and may be reused to connect further adapters and elastomeric tubings. As illustrated, the connector 50 further comprises a flange 53 at the forward end thereof which ensures that the connector 50 is inserted into the axial bore 12 to a predetermined depth.

It is to be noted that the flange 53 is not a required feature but rather an optional feature that can be utilized when desired. It is further to be noted that the connector 50 is illustrated to be positioned within the axial bores of the adapter 40 and the elastomeric tubing 10. However, the connector 50 is not limited to such configuration, and any other suitable configuration is also applicable. For example, the connector 50 may be an elastomeric tubing put around (for example, pushed on) at least part of the constant diameter outer surface of the elastomeric tubing 10 and at least part of the second radially outer surface 46 of the adapter 40 respectively with a snug fit.

It should be appreciated that positioning the adapter 40 coaxially adjacent the elastomeric tubing 10 without using the connector 50 is also feasible. For example, the adapter 40 can be engaged with the pressure applying means 20 and the manually held coaxially with the elastomeric tubing 10 in an initial step, and afterwards inserting the support core 30 into the elastomeric tubing 10 and then the manual holding force is removed. Since the adapter 40 is squeezed between the pressure applying means 20 and the elastomeric tubing 10 during insertion of the support core 30, the coaxial alignment between the elastomeric tubing 10 and the adapter 40 is retained.

From the above, an advantage achievable by employing devices and methods according to the disclosure is that sleeves, for example, sleeves for pre-loaded cold shrink and sleeves for push-on can be expanded on site using conventional field expansion apparatus without any modification on current molds for them. In other words, by employing devices and methods according to the disclosure, sleeves for pre-loaded cold shrink and sleeves for push-on are compatible with at least two kinds of methods for applying sleeves over substrates. Therefore the devices and methods according to the disclosure are advantageous in cost-sensitive applications.

Furthermore, field expanding the sleeves, for example, sleeves for pre-loaded cold shrink and sleeves for push-on on site is advantageous in that the magnitude to which the sleeves are expanded can be determined by the user depending on the diameter of the cable to be spliced or terminated. Preferably, the elastomeric tubing 10 is made of materials having a shore A hardness of less than 45 or materials with an elongation greater than 300%, for example, liquid silicone rubber, so that the elastomeric tubing 10 is applicable to cables of a wide diameter range.

Moreover, since the elastomeric tubing 10 does not have a step portion as in the case of conventional sleeves used in conventional field expansion methods, the risk of insulation failure caused by stress concentration at the step portion is lowered or eliminated.

Figure 9:
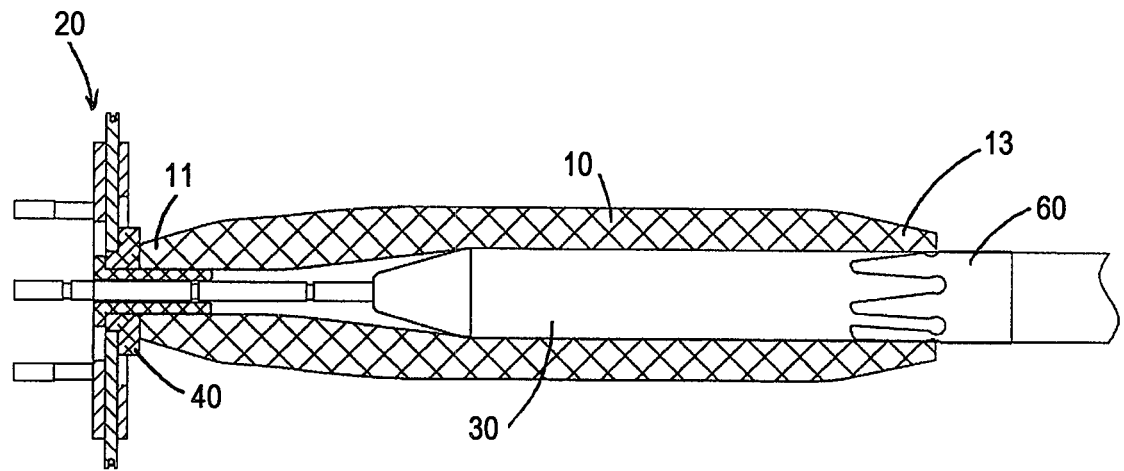
FIG. 9 illustrates a cross sectional view of a process to press a support core into the elastomeric tubing in FIG. 1 using another embodiment of the method according to the disclosure.

FIG. 9 illustrates a cross sectional view of a process to insert the support core 30 into the elastomeric tubing 10 in FIG. 1 using another embodiment of the method according to the disclosure. In comparison to the process illustrated in FIG. 4, the process further comprises positioning a spacer 60 around a forward end of the support core 30 to provide a gap between the rearward end 13 of the elastomeric tubing 10 and the support core 30 during the insertion, the advantages of which will be apparent from the following description.

Figure 10:
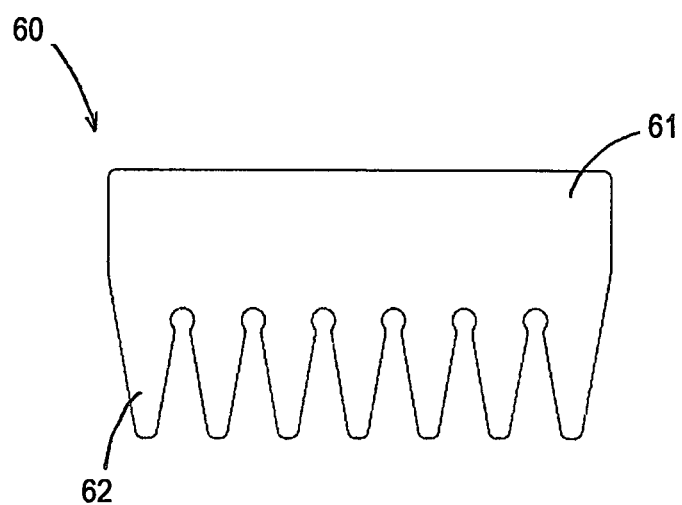
FIG. 10 illustrates a plane view of an embodiment of a spacer according to the disclosure.

An embodiment of the spacer 60 applicable to the process in FIG. 9 is shown in FIG. 10. The spacer 60 comprises a pad having a base portion 61 and a plurality of fingers 62 extending from the base portion 61. The spacer 60 may be made from an elastomer with hardness greater than that of the elastomeric tubing 10 and smaller than that of the support core 30. For example, the spacer 60 comprises an elastomer of shore D hardness of 40-70 while the elastomeric tubing 10 comprises an elastomer of shore A hardness of 50-75. Preferably, the ends of the plurality of fingers 62 and the joining portions of the plurality of fingers 62 with the base portion 61 are rounded off to reduce or eliminate any risk of damage to the inner surface of the elastomeric tubing 10.

In operation, the spacer 60 is wrapped around the outer surface adjacent the forward end of the support core 30 and then the support core 30 along with the spacer 60 is inserted into the axial bore 12. The spacer 60 is inserted a predetermined depth into the axial bore 12 such that the base portion 61 remains outside of the axial bore 12 and the edges of the pad at the base portion 61 warps outwardly from the axis which prevents the base portion 61 from being dragged into the axial bore 12 during insertion of the support core 30, in such manner the spacer 60 stays at the rearward end 13 of the elastomeric tubing 10 and retains a gap between the rearward end 13 and the support core 30. After the homing head 32 is pushed out of the elastomeric tubing 10, the spacer 60 is removed and may be reused for inserting further support cores.

Preferably, the friction coefficient between the spacer 60 and the elastomeric tubing 10 is greater than that between the spacer 60 and the support core 30 so that the support core 30 can be inserted more smoothly.

It should be noted that the spacer 60 is not limited to the configuration illustrated in FIG. 10. The spacer 60 may take on any suitable form, for example, a plurality of separate fingers. In operation, the plurality of separate fingers is fixed in an axial position along the outer surface of the support core 30 by, for example, adhesive tape. After the support core 30 along with the plurality of separate fingers fixed in position thereon is inserted a predetermined depth into the axial bore 12 with a length of the plurality of separate fingers remaining outside of the axial bore 12, the adhesive tape is removed. As a result, the outside part of the separate fingers wraps outwardly from the axis which prevents the part from being dragged into the axial bore 12 during insertion of the support core 30, in such manner the spacer 60 stays at the rearward end 13 of the elastomeric tubing 10 and retains a gap between the rearward end 13 and the support core 30.

From the above, in addition to the advantages listed, the configuration of the spacer 60 reduces the interfacial area between the surface of the bore 12 and the outer surface of the support core 30 so that the support core 30 can be inserted more easily or at a faster speed.

Further more, since a gap is provided between the surface of the axial bore 12 and the outer surface of the support core 30, lubricant can be left uniformly distributed along the surface of the axial bore 12.

In addition, since the material of the spacer 60 is harder than that of the elastomeric tubing 10, the serious deformation at the rearward end 13 of the elastomeric tubing 10 is prevented during insertion of the support core 30.

The methods and devices according to the disclosure are illustrated with the elastomeric tubing having a tapered portion. However, the methods and devices are not limited thereto. The methods and devices can be applied to elastomer tubing with any other suitable configurations, for example, an elastomer tubing having constant diameter.

In the disclosure herein, operations of device embodiment(s) may be described with reference to method embodiment(s) for illustrative purposes. However, it should be appreciated that the operations of the devices and the implementations of the methods in the disclosure may be independent of one another. That is, the disclosed device embodiments may operate according to other methods and the disclosed method embodiments may be implemented through other devices.

It should be noted that the above described embodiments are given for describing rather than limiting the invention, and it is to be understood that modifications and variations may be resorted to without departing from the spirit and scope of the invention as those skilled in the art readily understand. Such modifications and variations are considered to be within the scope of the invention and the appended claims. The protection scope of the invention is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed:

1. A device, into which a support core is to be inserted by a field expansion apparatus, the field expansion apparatus having a pressure applying means defining a radially expandable inner surface and a flat surface radially outwardly extending from the radially expandable inner surface, the device comprising:
   an elastomeric tubing, having a forward end opposite a rearward end and an axial bore extending therethrough configured to receive the support core; and
   an adapter, having a step portion defined by a radial outer surface and a flat surface radially outwardly extending from the radial outer surface, and an axial bore extending therethrough, the axial bore having a diameter substantially the same as the diameter of the axial bore of the elastomeric tubing;
   the adapter being positioned substantially coaxially with the elastomeric tubing between the pressure applying means and the elastomeric tubing such that, in response to inserting the support core from the rearward end into the elastomeric tubing, the flat surface of the adapter is pushed against the flat surface of the pressure applying means by the elastomeric tubing, the interface between a rearward end of the adapter and the forward end of the elastomeric tubing is of high friction so that the adapter and the elastomeric tubing expand radially in unison, and the radial outer surface of the adapter exerts a radially outward pressure against the radially expandable inner surface of the pressure applying means.

2. The device of claim 1, further comprising:
   a connector, configured to provide an axial alignment between the elastomeric tubing and the adapter.

3. The device of claim 2, wherein the connector comprises a cylindrical outer surface with a diameter substantially same as the diameter of the axial bores and is positioned within at least a portion of each of the axial bores.

4. The device of claim 1, wherein the elastomeric tubing has a shore A hardness of less than 45.

5. The device of claim 1, wherein the elastomeric tubing comprises one of silicone rubber, ethylene propylene rubber, and ethylene propylene diene monomer rubber.

6. The device of claim 1, wherein the elastomeric tubing and the adapter comprise an elastomer with an elongation greater than 300%.

7. The device of claim 1, wherein the adapter further comprises a second radial outer surface extending rearwardly from the flat surface and terminating at a rearward end of the adapter, and wherein the diameter of the second radial outer surface is greater than the outside diameter of the elastomeric tubing.

8. The device of claim 7, wherein the elastomeric tubing is tapered at the forward end and the diameter of the second radial outer surface is greater than the outside diameter at the forward most location of the elastomeric tubing.

9. The device of claim 1, further comprising a lubricant layer of a viscosity higher than $3 \times 10^5$ mPa·s which is applied to a surface of the axial bore of the elastomeric tubing and an outer surface of the support core.

10. The device of claim 1, further comprising a spacer configured to be positioned at the rearward end of the elastomeric tubing between the axial bore of the elastomeric tubing and the support core during insertion of the support core into the elastomeric tubing.

11. The device of claim 10, wherein the spacer comprises a pad having a base portion and a plurality of fingers extending from the base portion, the pad comprising an elastomer with a hardness greater than that of the elastomeric tubing and smaller than that of the support core.

12. A method, comprising:
    positioning an adapter substantially coaxially with an elastomeric tubing, the elastomeric tubing having a forward end opposite a rearward end and an axial bore extending therethrough configured to receive a support core, the adapter having a step portion defined by a radial outer surface and a flat surface radially outwardly extending from the radial outer surface, and an axial bore extending therethrough, the axial bore having a diameter substantially the same as the diameter of the axial bore of the elastomeric tubing;
    engaging the radial outer surface of the adapter with a radially expandable inner surface defined by a pressure applying means of a field expansion apparatus; and
    inserting the support core having an outside diameter greater than the diameter of the axial bores from the rearward end into the elastomeric tubing.

13. The method of claim 12, further comprising:
    prior to the step of inserting, applying a lubricant layer of a viscosity higher than $3 \times 10^5$ mPa·s to a surface of the axial bore of the elastomeric tubing and an outer surface of the support core.

14. The method of claim 12, further comprising:
    prior to the step of inserting, positioning a spacer around a forward end of the support core.

15. The method of claim 14, wherein the spacer comprises a pad having a base portion and a plurality of fingers extending from the base portion, the pad comprising an elastomer with a hardness greater than that of the elastomeric tubing and smaller than that of the support core.

* * * * *